(12) United States Patent
Garceau

(10) Patent No.: US 7,169,502 B2
(45) Date of Patent: Jan. 30, 2007

(54) FUEL CELL STRUCTURE

(75) Inventor: Patrick Garceau, Saint Pierre D'Autils (FR)

(73) Assignee: Snecma Moteurs, Paris (FR)

( * ) Notice: Subject to any disclaimer, the term of this patent is extended or adjusted under 35 U.S.C. 154(b) by 0 days.

(21) Appl. No.: 10/977,117

(22) Filed: Oct. 29, 2004

(65) Prior Publication Data
US 2005/0136318 A1 Jun. 23, 2005

(30) Foreign Application Priority Data
Oct. 30, 2003 (FR) .................................. 03 12718

(51) Int. Cl.
H01M 2/00 (2006.01)
H01M 2/14 (2006.01)

(52) U.S. Cl. .......................................... 429/34; 429/38

(58) Field of Classification Search .................. 429/20, 429/34, 38
See application file for complete search history.

(56) References Cited

U.S. PATENT DOCUMENTS

| | | | |
|---|---|---|---|
| 6,040,075 A * | 3/2000 | Adcock et al. ................ | 429/32 |
| 6,103,413 A * | 8/2000 | Hinton et al. ................ | 429/32 |
| 6,174,616 B1 * | 1/2001 | Marvin et al. ................ | 429/34 |
| 6,218,035 B1 * | 4/2001 | Fuglevand et al. ........... | 429/30 |
| 6,444,340 B1 * | 9/2002 | Jaffrey .......................... | 429/30 |
| 2002/0160244 A1 * | 10/2002 | Wu et al. ...................... | 429/26 |
| 2004/0151970 A1 * | 8/2004 | Ferguson ..................... | 429/38 |

FOREIGN PATENT DOCUMENTS

| | | |
|---|---|---|
| DE | 199 47 858 | 4/2001 |
| WO | WO 03/047017 | 6/2003 |

* cited by examiner

*Primary Examiner*—Patrick Joseph Ryan
*Assistant Examiner*—Ben Lewis
(74) *Attorney, Agent, or Firm*—Weingarten, Schurgin, Gagnebin & Lebovici LLP

(57) ABSTRACT

A structure for a fuel cell comprising at least one cell formed by first and second electrodes separated by a an electrolyte, the cell being disposed between first and second interface elements for feeding the electrodes of the cell with reagent and for collecting the electric current it produced. Each interface element comprises a distributor element of insulating material including distribution channels at least in its face facing one of the electrodes for the purpose of diffusing a reagent, and at least one collector element of conductive material interposed between the electrode and the elements made of insulating material. The collector element presents perforations so as to enable the reagent to diffuse between the channels of the distributor element and the electrode facing it.

9 Claims, 6 Drawing Sheets

FUEL CELL STRUCTURE

This application claims priority to a French application No. 03 12718 filed Oct. 30, 2003.

FIELD OF THE INVENTION

The present invention relates to fuel cells, and more particularly to the internal structure that forms the core of such a cell.

BACKGROUND OF THE INVENTION

Fuel cells typically comprise a set of individual cells each constituted by two electrodes (anode and cathode) separated by an electrolyte and assembled one against the other so as to form a stack. By feeding each electrode with an appropriate reagent, namely a fuel for one of the electrodes and an oxidizer for the other, an electrochemical reaction is obtained which enables a potential difference to be created between the electrodes, and thus enables electricity to be produced. The stack corresponds to the core of the fuel cell since it is within the stack that the electrochemical reaction takes place that enables electricity to be generated.

In order to feed each electrode with reagent and to collect the electricity produced, specific interface elements are used that are generally referred to as "bipolar plates", which elements are disposed on either side of the individual cells.

Such bipolar plates are generally in the form of a single component adjacent to the anode or cathode support. They perform several functions associated with the chemical reaction respectively at the cathode and at the anode. These functions are as follows:

feeding the electrodes with reagent;
enabling each of the reagents to circulate in confinement;
collecting electrical current and providing electrical continuity through the stack;
collecting and removing the water produced together with any excess reagent; and
removing the heat energy dissipated by the reaction.

Consequently, such elements are subjected to numerous constraints concerning selection of their component material(s) and their methods of manufacture. The elements must be made of a material which is simultaneously a good conductor of electricity and heat, which withstands attack from the medium (acidic or basic), and which is impermeable to the reacting gases. In addition, each element must include millimetric distribution channels on each of its faces in order to enable the reagent to be delivered uniformly to the electrodes and in order to manage removal of water together with any excess reagent.

The most common embodiments make use of graphite, and machining techniques are implemented using tools, such as etching, in order to form the reagent distribution channels. Such machining techniques are very expensive and difficult to reproduce identically for each part.

Another known technique consists in using thin-plate metal heat-exchanger technology, where the plates are shaped by stamping or thermocompression, for example. Nevertheless, making and assembling such parts is difficult since that assumes that leaktightness is guaranteed between the assembled elements, which makes large-scale industrial manufacture difficult to envisage.

Whatever the technique that is adopted, it is the interface element forming the bipolar plate that determines the size and the mass of the stack, and above all, to a very large extent, the cost of the structure, and thus the cost of the fuel cell.

Thus, in spite of their high energy efficiency, and in spite of being environmentally friendly in operation, fuel cells are present in very few apparatuses, and often only on an experimental basis. Industrial and commercial development of fuel cells is presently greatly restricted by certain difficulties that have not yet been overcome. At present, cost represents the main obstacle to large-scale production and competitive commercialization of fuel cells.

OBJECT AND SUMMARY OF THE INVENTION

The present invention seeks to propose a fuel cell structure of design that makes mass production easy with low-cost materials, thereby significantly reducing the cost of manufacture while guaranteeing the performance and the reliability of the fuel cell.

In accordance with the invention, this object is achieved by the fact that the interface elements which are interposed between successive individual cells and which serve to feed the electrodes of the cell with reagent and to collect the current produced, are constituted firstly by a distributor element made of an electrically insulating material which includes distribution channels at least in its face facing an electrode in order to distribute reagent, and secondly by at least one collector element of conductive material interposed between the element made of insulating material and the electrode, the collector element presenting perforations so as to allow the reagent to pass between the channels of the distributor element and the electrode facing it.

The invention thus provides a design for the structure of fuel cells in which the functions of distributing reagent and of collecting current are performed by distinct elements. Such a design makes it possible to use manufacturing materials that are less expensive and easier to work industrially than those presently in use, in particular in designs where a single element needs to perform both the reagent distribution function and the current collection function simultaneously.

Thus, the component material of the distributor element is selected from electrically insulating materials, thus providing a wide range of possible materials at low cost price, and from which it is well known how to mass-produce parts at low cost. Thus, in general, the distributor element can be made from any plastics material suitable for being shaped by pressing, injection molding, extrusion, etc. By way of example, the distributor element may be made from an injected thermoplastic material, thus enabling accurate manufacture in large quantities, thereby minimizing the cost of manufacturing the element. Such a thermoplastic can be epoxy resin, preferably containing a mineral fill in order to improve its thermal conductivity.

Similarly, the materials available for manufacturing the collector element are numerous. It is thus easy to select such a material which is simultaneously low cost, strong, and easy to work, such as a stainless steel or copper. This type of material can easily be delivered in the form of thin metal sheets, thereby further reducing the number of operations needed for manufacturing the collector element.

According to a characteristic of the invention, the distributor element includes an internal circuit for circulating a cooling fluid. This circuit represents an important advantage of the structure of the invention since it enables the fluid used for cooling to be insulated electrically from the remainder of the structure. The distributor element of the invention is made of an insulating material, thus enabling a heat-conveying fluid to be caused to circulate within said material so as to remove the heat that is generated while avoiding the formation of any undesirable electrical connections (e.g. short circuits) inside the fuel cell.

When the distributor element includes a circuit of channels in each of its faces, each circuit can open out into different orifices, thereby enabling one face to be fed with a first reagent and the other face with a second reagent. Under such circumstances, the distributor element is received inside a collector element constituted by a metal sheet that is folded in half, the cell being sandwiched between two distributor/collector pairs assembled together in this way.

Otherwise, the channels in each face may open out together into the same orifices. Under such circumstances, the two faces of a given distributor element are fed with the same reagent. The collector element may also be made from a metal sheet folded in half, but forming a housing of larger size in order to enable not only a distributor element to be received therein but also half of the adjacent collector element together with the cell. Such a disposition enables alternating polarity to be re-established between two adjacent cells in the stack.

The invention also provides a fuel cell comprising one or more structures as described above.

BRIEF DESCRIPTION OF THE DRAWINGS

Other characteristics and advantages of the invention appear from the following description of particular embodiments of the invention given as non-limiting examples, with reference to the accompanying drawings, in which.

DETAILED DESCRIPTION OF AN EMBODIMENT

Figure 1:
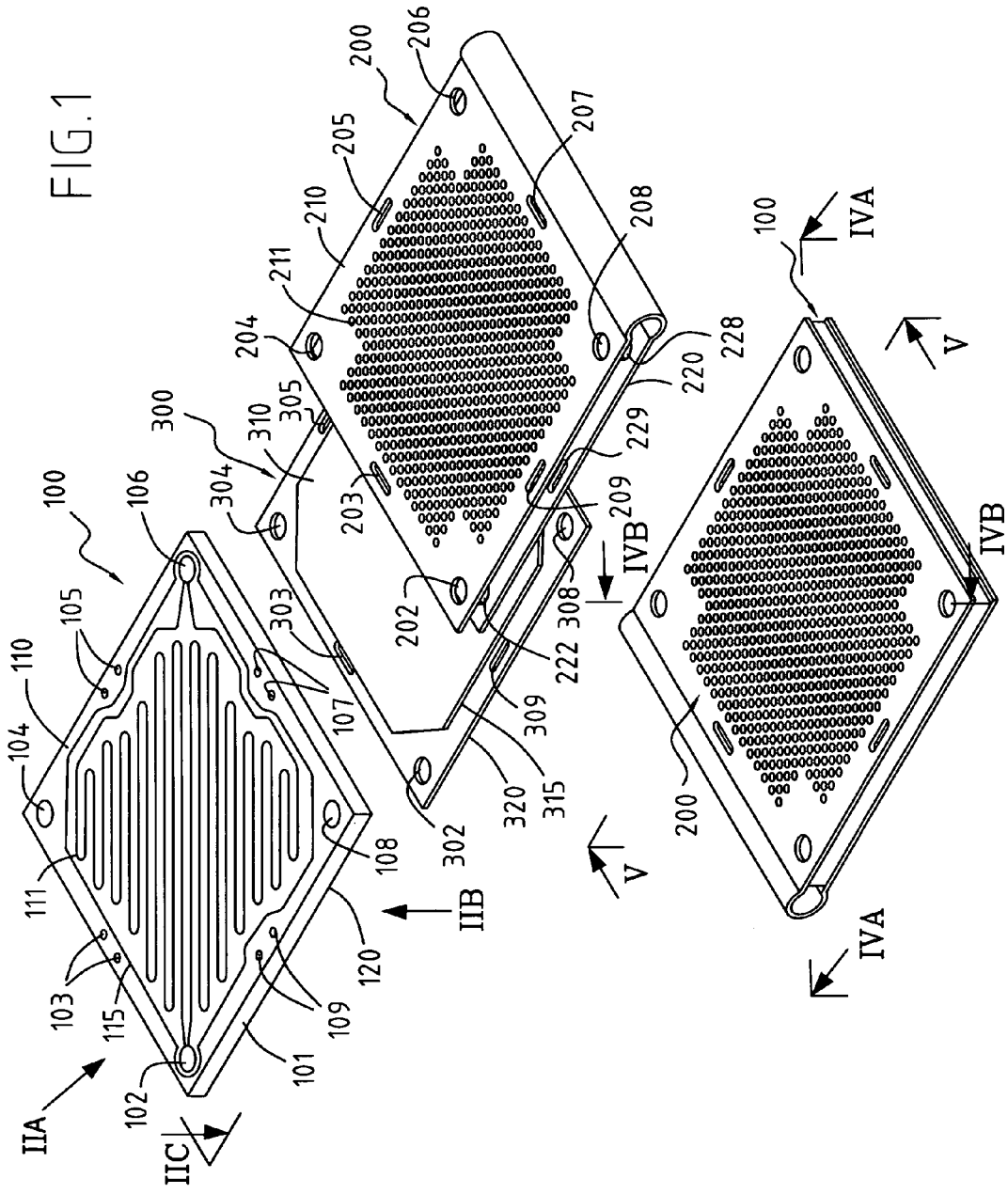
FIG. 1 is a diagrammatic perspective view of an embodiment of a fuel cell structure in accordance with the invention.

FIG. 1 shows the component elements of a fuel cell structure in accordance with the invention. In order to avoid burdening the description of the invention, the assembly shown in FIG. 1 corresponds to a minimum structure or stack suitable for use in making up the core of a fuel cell. Nevertheless, a fuel cell of the invention may naturally comprise a plurality of such structures. In known manner, the number of structures and the way in which they are connected in series or in parallel depends on the voltage and current conditions that are desired of the fuel cell.

The structure of the invention is made up of an individual cell 300 comprising a first electrode 310 and a second electrode 320 separated by a membrane (not shown) which acts as an electrolyte. These elements may be assembled together when the fuel cell is manufactured or they may be in the form of a single electrode-membrane-electrode (EME) component. Each electrode further comprises a gasket around its periphery such as the gasket 315 shown for the electrode 310 in FIG. 1. This portion of the fuel cell structure is well known in itself and is not described in greater detail herein. The present invention can be implemented using any type of individual cell.

In order to enable the electrochemical reaction to take place, each of the electrodes in the cell 300 must be fed with a different reagent, namely a fuel for one of them, generally hydrogen, and an oxidizer for the other, usually oxygen or more simply air optionally enriched in oxygen. If the electrode 310 receives hydrogen, it then corresponds to the anode, and the electrode 320 receiving oxygen forms the cathode. For reasons of clarity, the above configuration is maintained throughout the description below.

Figure 2A:
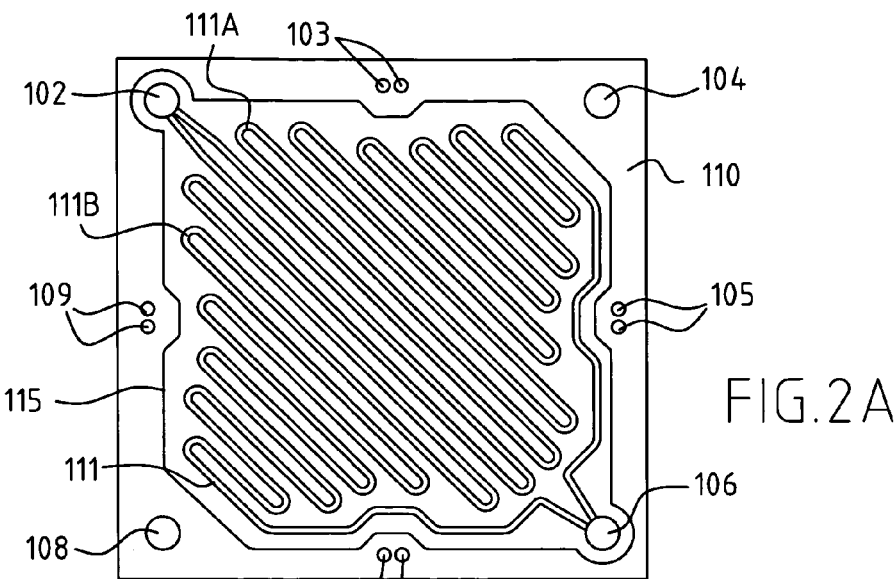
FIGS. 2A, 2B, and 2C are respectively a view from above, a view from beneath, and a section view of the distributor element of FIG. 1.
Figure 2B:
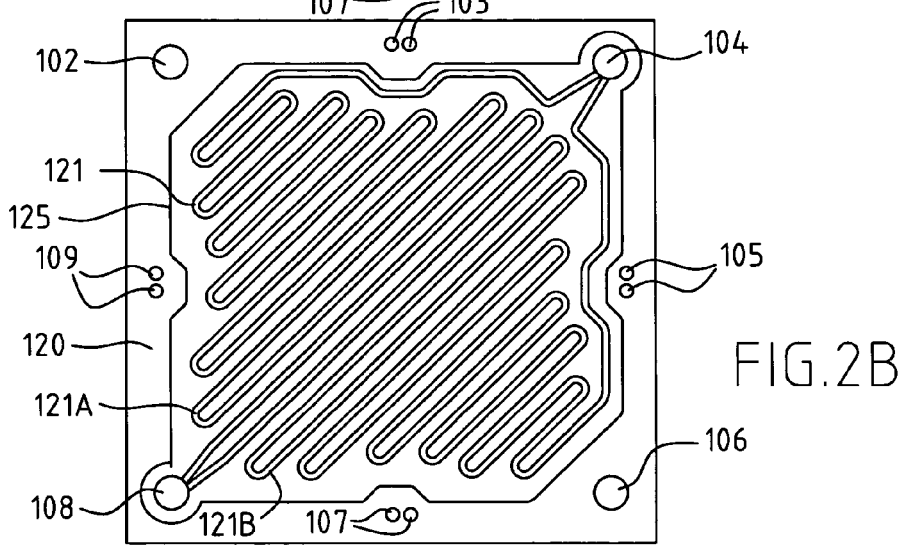

In order to feed each electrode with reagent, the structure includes two distributor elements 100 which are disposed on either side of the cell 300. Each element 100 presents two faces IIA and IIB including distribution channels which extend over a zone corresponding substantially to the area of the electrode over which the reagent is to be distributed. FIG. 2A shows the face IIA of the element 100 shown in FIG. 1. On this face, the element 100 presents a surface 110 having distribution channels 111 formed therein. The channels 111 are fed with reagent via an orifice 102 which communicates with a reagent feed circuit of the fuel cell. Excess reagent and the water produced during the electrochemical reaction are removed via an orifice 106 which communicates with an exhaust circuit of the fuel cell. As shown in FIG. 2A, the reagent introduced via the orifice 102 flows in the channels 111 from the center towards the outside via two separate circuits 111A and 111B both of which open out into the exhaust orifice 106. This enables reagent to circulate continuously over the surface 110 of the distributor element 100. FIG. 2B shows the face IIB of the element 100. This face differs from the face IIA in that the channels 121 formed in its surface 120 are connected to two different orifices 104 and 108. This is due to the fact that the distributor element 100 is for distributing a different reagent on each of its faces. Furthermore, in order to ensure that the two reagents do not meet, the channels 111 in the face IIA and the channels 121 in the face IIB must not communicate with one another. In a manner similar to the channels 111, the channels 121 comprise two separate circuits 121A and 121B, each receiving reagent via an orifice 108, with excess reagent and the water collected in the channels being removed via the orifice 104.

Figure 2C:
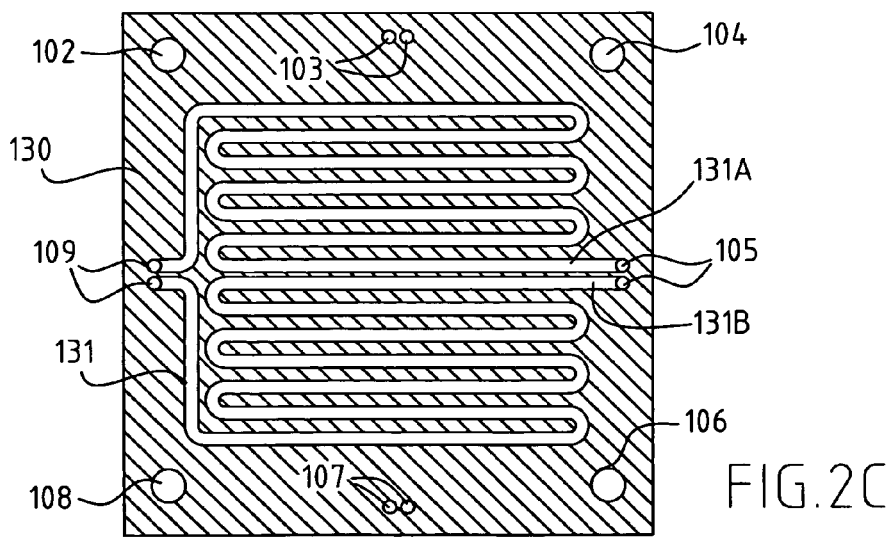

The distributor element 100 of the invention further comprises an internal circuit for circulating a cooling fluid. This circuit is shown in FIG. 2C which shows the internal portion of the element 100 in section on IIC as shown in FIG. 1. As shown in FIG. 2C, the element 100 contains channels 131 which, unlike the channels formed in its surfaces, are confined to the inside of the element 100. The channels 131 form a circuit 130 for circulating a cooling fluid, such as a heat-conveying fluid. Since the heat given off by the electrochemical reaction is greater at the center of the elements than at their periphery, it is preferable to cause the cooling circuit to circulate firstly to the center of the element so as to maximize removal of heat from the hottest zone. To this end, as shown in FIG. 2C, the channels 131 comprise two separate circuits 131A and 131B each covering half of the element and starting from the center thereof. Thus, a cooling fluid received by the orifice 105 circulates initially in the central portion of the element which is the hottest portion, and then as the fluid heats up it circulates towards the cooler portions prior to being removed via the orifice 109.

Such an internal cooling circuit presents a major advantage since it enables the fluid that is used for cooling to be insulated electrically from the remainder of the structure. The distributor element of the invention is made up of an electrically insulating material that enables a fluid to circulate internally for removing the heat that is generated, while preventing any undesirable electrical connections (e.g. short circuits) being formed inside the fuel cell.

Thus, the material used for making the distributor element must be an electrically insulating material, and it should preferably present relatively good thermal conductivity, which leaves a wide range of possible materials from which a material can be selected that is inexpensive and with which it is well known how to mass-produce parts at low cost. Consequently, the distributor element may be made from any plastics material suitable for being shaped by pressing, injection molding, extrusion, etc. By way of example, the distributor element may be an injected thermoplastic material part, thus enabling precise mass production to be performed at a cost that is low in comparison, for example, with the cost of graphite as is used in conventional structures, and is not only expensive to purchase, but is also difficult and expensive to work. Such a thermoplastic may be an epoxy resin that preferably includes a mineral filler in order to improve its thermal conductivity.

Figure 3:
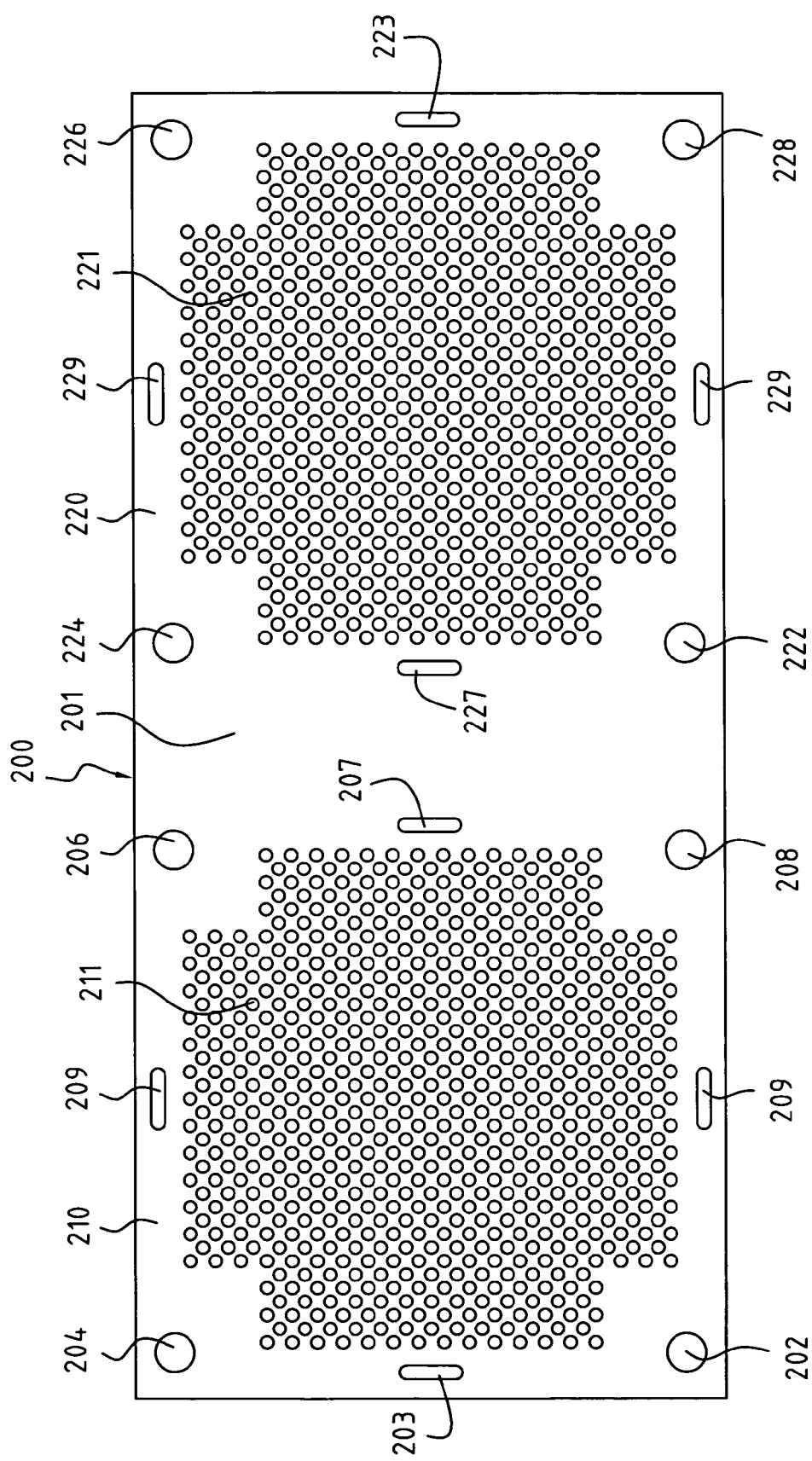
FIG. 3 is a view of the collector element of FIG. 1 prior to folding.

Since the distributor element is made of insulating material in accordance with the invention, it is necessary to establish an electrical connection around said element in order to provide electrical continuity in the structure and in order to enable electric current to be collected from the fuel cell. To this end, the structure of the invention includes a conductor element 200 of an electrically conductive material. Any type of conductive material can be suitable for making the element 200. Nevertheless, it is preferable to select a material that withstand oxidation, such as stainless steel or copper. Still for the purpose of reducing manufacturing cost, it is preferable to select a low-cost material that is sold in the form that is ready for use. By way of example, the elements 200 may be made from thin metal sheets. As shown in FIG. 3, the conductor element 200 is made from a rectangular plate which, once folded in half, forms a housing for the distributor element 100 (FIG. 1) so as to enable current to pass between the two faces of the element 100.

Once the FIG. 1 structure has been assembled, one of the two portions 210, 220 of the conductor element 200 is interposed between a distributor element and the individual cell 300. It is therefore necessary to ensure that said conductor element 200, which surrounds the distributor elements 100, does not prevent reagent from flowing between the distributor element and the electrode of the cell 300. For this purpose, each portion 210, 220 of the element 200 presents respective perforations 211 or 221 forming a grid that extends substantially over a zone that corresponds to the zone over which the reagent flows on the surface of the distributor element. Openings of different shapes and sizes may be provided instead of the perforations 211 and 221. In general, the collector elements of the invention include openings of dimensions that are selected in such a manner as to enable reagent to flow to the electrode while ensuring complete irrigation of the channels with reagent so as to impregnate the entire surface of the electrode uniformly. If the openings are too large, then the distribution of reagent over the surface of the electrode will not be uniform, since the channels are not regularly irrigated over their entire length. In addition, if the gaseous flow of reagent does not flow all along the channels, it no longer exercises its entrainment effect all the way to the outlet orifice, so it is no longer possible to guarantee that the water produced in the distributor element can be exhausted. The dimensions of the openings are determined as a function of the dimensions of the channels.

Furthermore, by providing a plurality of perforations or openings, the conductor element is made permeable to the reagent while conserving a multiplicity of small portions of material that constitute as many paths for electric current and support points for the electrodes, which are themselves mechanically fragile.

Sealing between the distributor elements 100 and the conductor elements 200 may be provided in various ways. In conventional manner, the elements (i.e. individual cells, distributor elements, and collector elements) of the structure (s) forming the core of the fuel cell are held against one another with a relatively large clamping force. Thus, when the materials of the collector elements and of the distributors are compatible, as is the case for a metal and a plastics material, sealing between these elements is achieved merely by contact between the surface of the elements. When the two materials are too hard, one technique consists in placing a cut-out gasket on the surface 110 and 120 so as to cover the surfaces with the exception of the channels and the orifices. Nevertheless, care must be taken to ensure that the gasket is flattened sufficiently to maintain the collector element in contact with the channels so as to allow the flow of reagent to travel all along the channels.

In another variant, sealing can be provided by means of gaskets 115 and 125 (FIGS. 2A and 2B) disposed respectively on the faces IIA and IIB of the element 100. Each gasket 115, 125 surrounds at least the channels and the two orifices with which they communicate respectively so as to prevent the reagent from spilling out from the structure. Under such circumstances, other gaskets (not shown) are provided for providing sealing around the remaining orifices.

Finally, in yet another possibility, the collector elements may be stuck to the distributor elements by means of a special adhesive enabling bonding to be achieved between metal and plastics material, for example. Under such circumstances, the adhesive is placed on all of the zones that are to be covered by a gasket, thereby providing not only bonding but also sealing between the collector and distributor elements.

Figure 5:
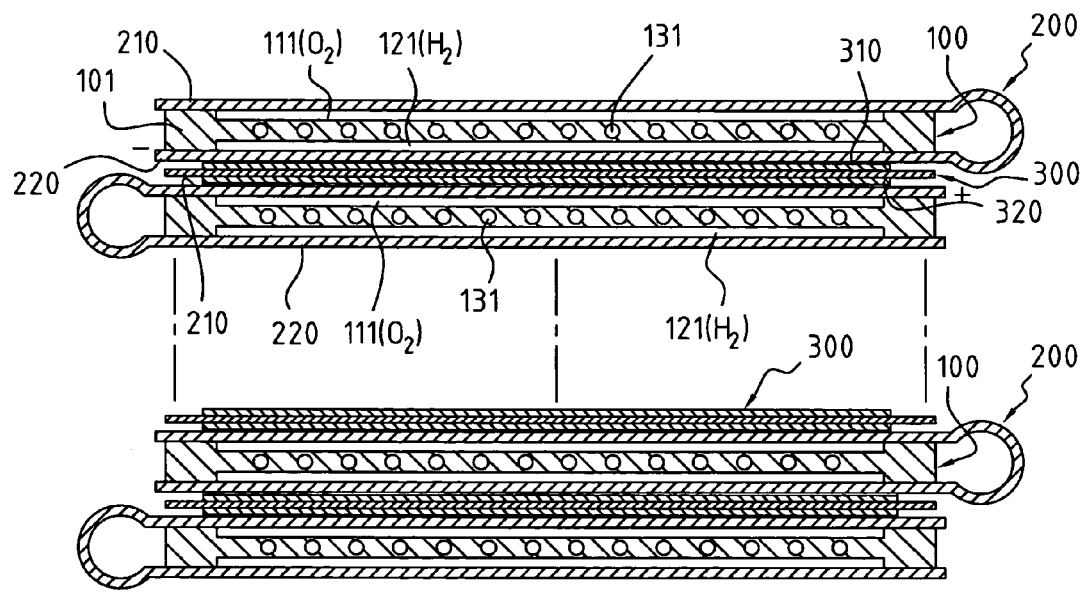
FIG. 5 is another section view of the FIG. 1 structure.

Once assembled together, the elements of FIG. 1 form a structure (FIG. 5) capable of generating electric current by the reaction of oxidizing the hydrogen introduced to the electrode 310 (anode) and reducing the oxygen on the electrode 320 (cathode), thereby creating a potential difference between the portions 220 and 210 of the two conductor elements. As shown in FIG. 5, the fuel cell may be made up as a stack of identical structures, with the number and the area of the stacked structures depending on the power that is to be delivered by the fuel cell, which may lie in the range a few watts to several megawatts.

Figure 4A:
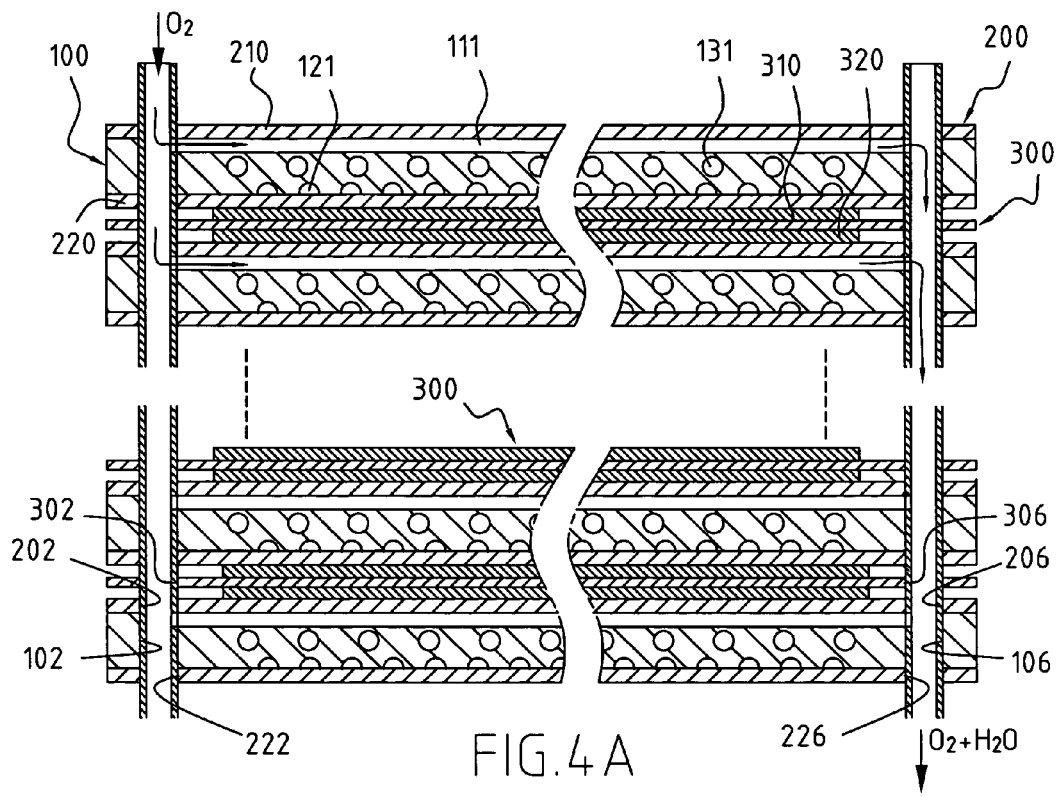
FIGS. 4A and 4B are section views of the FIG. 1 structure showing in particular how reagents flow through the structure.
Figure 4B:
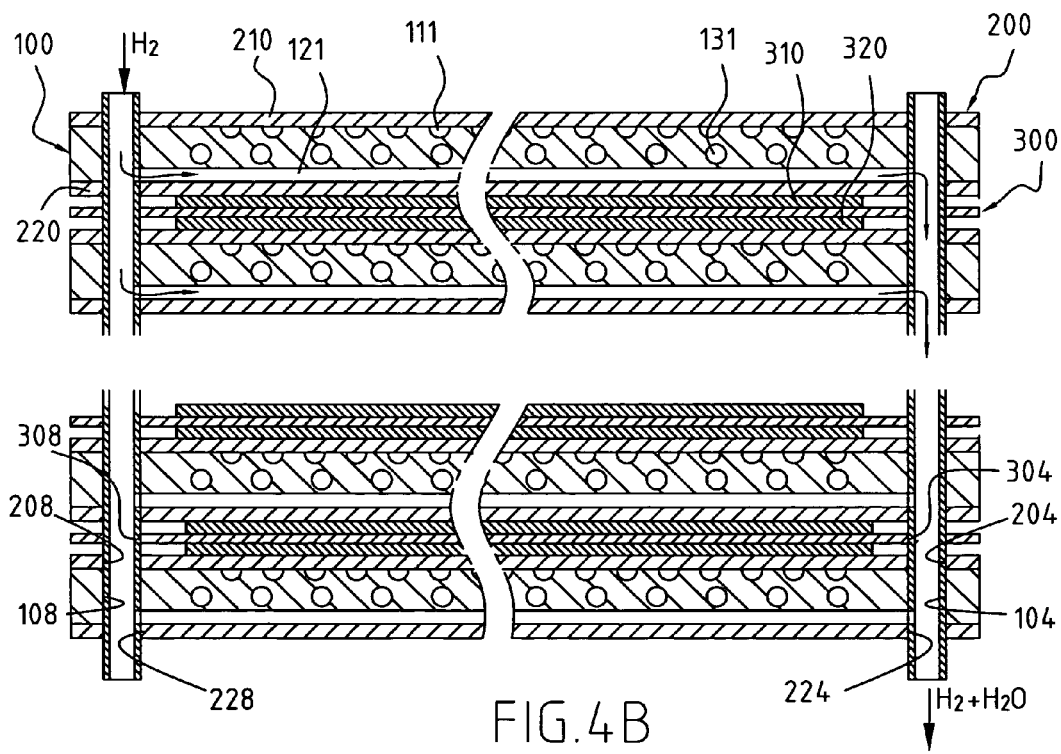

The distributor elements 100, the conductor elements 200, and the cells 300 all have a series of orifices for enabling the two reagents and the cooling fluid to circulate separately through the structure and also enabling excess reagent and the water that is produced to be removed therefrom. As shown in FIG. 4A, once the structure has been assembled, the orifices 102, 202, 222, and 302 respectively of the distributor element 100, of the conductor element 200, and of the cell 300 co-operate to form a flow duct for feeding oxygen to the channels 111. Excess oxygen and the water produced by the reaction are evacuated by a circuit formed by co-operation between the orifices 106, 206, 226, and 306. Similarly, as shown in FIG. 4B, the orifices 108, 208, 228, and 308 co-operate to allow hydrogen to flow through the structure and feed the channels 121, with excess hydrogen and the water produced by the reaction being removed via the circuit formed by co-operation between the orifices 104, 204, 224, and 304. The ducts shown in FIGS. 4A and 4B are merely a diagrammatic representation of the ducts that are formed when the elements of the structure are held pressed against one another, the ducts being formed naturally by the co-operating orifices, possibly in association with a gasket, as described above.

In the same manner, cooling fluid is fed and removed respectively via the orifices 105, 205, 225, and 305, and via the orifices 109, 209, 229, and 309. Other orifices, such as the orifices 103, 107, 203, 207, 303, etc. . . . can also be provided for cooling fluid circulation, particularly if there is an angular offset between two successive distributor elements, or indeed for circulating other fluids.

The orifices of the distributor elements that are to receive the cooling fluid for the internal circuit 130, such as the orifices 105 and 109, nevertheless constitute a special case. In order to insulate the cooling fluid completely from the remainder of the structure, it is necessary to ensure that it does not come into contact with the collector elements which are conductive. This can occur at the inlet or the outlet of the internal circuit at the orifices for passing the cooling fluid formed in the collector elements, such as the orifices 205 and 209. For this purpose, the corresponding orifices in the distributor element may present rims that engage in the orifices of the collector element so as to form therein a duct that is electrically insulated from the conductive material of the collector element. In a variant, the gaskets of electrically insulating material may be disposed around the orifices of the distributor element, the gaskets presenting dimensions such that they engage in the orifices in the collector element like the rims described above.

Figure 6:
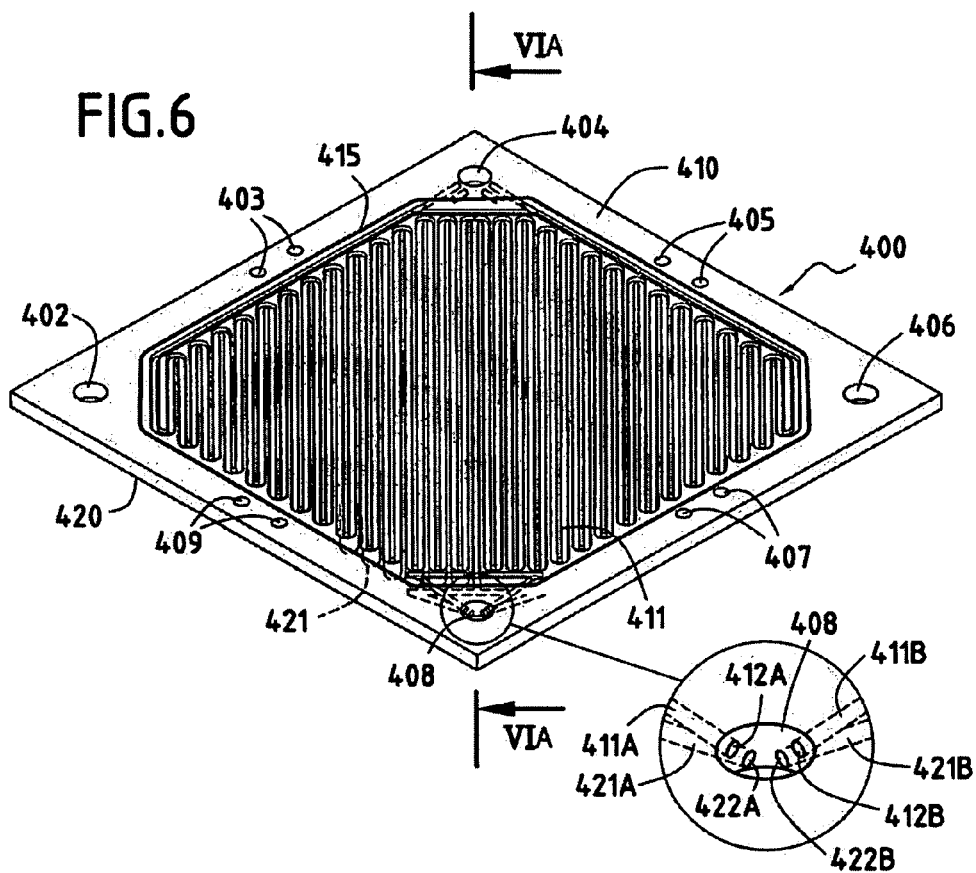
FIG. 6 is a perspective view of another embodiment of a distributor element in accordance with the invention.
Figure 6A:
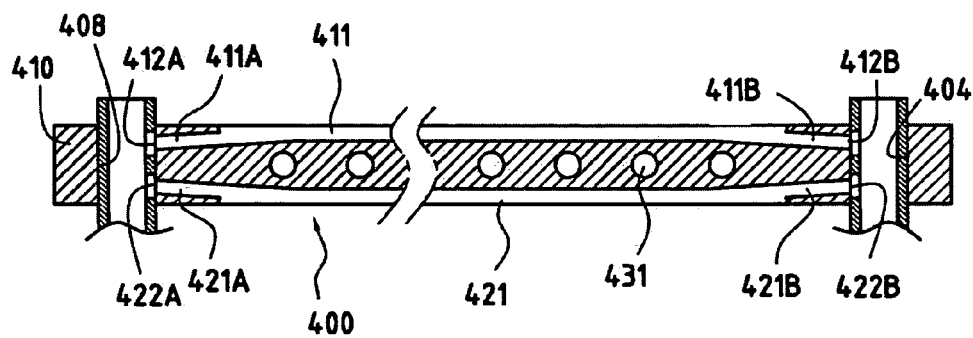
FIG. 6A is a section view of the FIG. 6 distributor element.

The distributor element 400 shown in FIGS. 6 and 6A differs from the element 100 in FIG. 1 in that it is designed to receive the same reagent on both faces. To this end, the channels 411 and 421 formed respectively in the surfaces 410 and 420 are fed with reagent via the same orifice 408. More precisely, the two circuits 411A and 411B of the channels 411 open out into the orifice 408 via respective openings 412A and 412B. Similarly, the two circuits 421A and 421B of the channels 421 open out into the orifice 408 via respective openings 422A and 422B. Thus, the reagent which flows via the orifice 408 is distributed both to the channels 411 and to the channels 422, and excess reagent together with the water produced by the reaction are removed via the opposite orifice 404 into which the channels 411 and 422 open out in the same manner as in the orifice 408.

Figure 7:
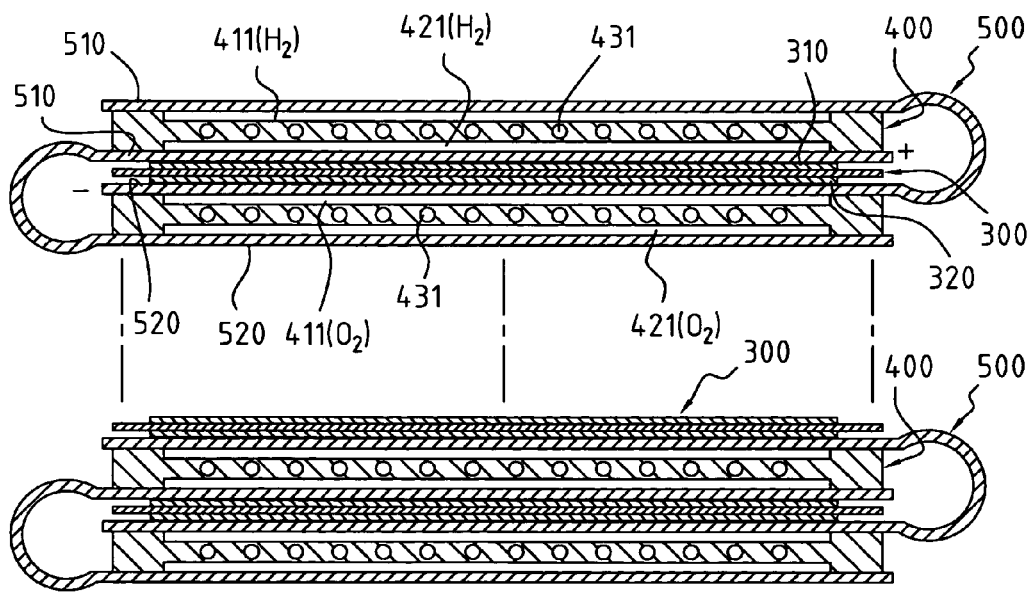
FIG. 7 is a section view showing a particular arrangement of a structure in accordance with the invention including the FIG. 6 distributor element.

The distributor elements 400 used in the structure are preferably identical so as to rationalize manufacture thereof. Under such circumstances, in the structure, two successive distributor elements are offset by one-fourth of a turn so that one of them receives hydrogen and the other receives oxygen. Furthermore, the use of distributor elements which distribute the same reagent on both faces means that the electrodes facing said element both have the same polarity. In order to remedy this situation and as shown in FIG. 7, conductor elements 500 are used that are substantially identical to the above-described elements 200 but having portions 510 and 520 that are spaced further apart from each other than in the element 200 so as to form a larger housing. This greater spacing between the portions enables the collector elements 500 to be placed in the structure in a manner that is different from that shown in FIG. 5 so as to inverse the polarities and re-establish the series "effect" in the stack. Concretely, as shown in FIG. 7, two successive conductor elements 500 are engaged one in another with the cell 300 being interposed between them.

The element 400 also differs from the element 100 in that the first circuit portions 411A, 411B, 422A, and 422B situated close to the orifices 404 and 408 are buried beneath the surface of the element. This serves to provide sealing between the surface of the distributor element and the conductor element by placing a gasket 415 which surrounds only the channels in the surface at a distance from the gasket 115 which is used with the element 100 and which must also surround the orifices into which the channels open out.

In addition, as for the above-described element 200, the distributor element 400 has an internal circulation circuit 431 (FIG. 6A) enabling a cooling fluid to circulate from an orifice 405 to an orifice 409 while remaining electrically insulated from the remainder of the structure, i.e. without it being possible for any electrical contact to be established between the cooling fluid and the other fluids and portions present in the structure.

What is claimed is:

1. A structure for a fuel cell comprising at least one cell formed by first and second electrodes separated by an electrolyte,
    at least two distributor elements of insulating material, each of said at least two distributor elements including distributor channels provided on its two faces,
    at least first and second collector elements each made of a conductive material and each including an upper portion and a lower portion having the same dimensions and being spaced apart from each other, said upper and lower portions being electrically connected together and presenting perforations;
    wherein said distribution channels open out together into first and second orifices passing through each of said at least two distributor elements, one of said orifices being used in common for supplying simultaneously a same reagent to both distribution channels provided on each of the two faces;
    wherein said at least first and second collector elements are engaged one in another, said at least one cell being placed between the upper portion of said second collector element and the lower portion of said first collector element; and
    wherein one of said at least two distributor elements is placed between the upper portions of said first and second collector elements while a second of said at least two distributor elements is placed between the lower portions of said first and second collector elements.

2. A structure according to claim 1, wherein the distributor element is made of plastics material.

3. A structure according to claim 1, wherein the distributor element further includes flow conduits internal to a flow plate comprising an internal circuit for circulating cooling fluid wherein the circuit has a planar orientation parallel to the planar aspect of the flow plate and wherein the circuit lies between the distribution channels on one face and the distribution channels on the other face of the distributor element.

4. A structure according to claim 3, wherein the internal circuit opens out to the surface of the distributor element via at least two orifices, and wherein the internal circuit is electrically insulated from the conductor element.

5. A structure according to claim 1, wherein the collector element is made of stainless steel or of copper.

6. A structure according to claim 5, wherein the collector element is constituted by a metal sheet that is folded in half, wherein said upper and lower portions having same dimensions and spaced apart from each other are completely overlapping each other in parallel alignment.

7. A structure according to claim 1, wherein sealing is provided between the distributor element and the collector element, which sealing is obtained by one of urging the surfaces of said elements towards one another, interposing one or more gaskets between said surfaces of said elements, and applying adhesive to the surfaces of said elements, or obtained by a combination thereof.

8. A fuel cell including at least one structure according to any one of claims 1 through 7.

9. A structure for a fuel cell comprising
an odd-numbered plurality of cells, each cell formed by first and second electrodes separated by an electrolyte,
a number of distributor elements of insulating material, said number being one more than the number of cells, each of said distributor elements including distributor channels provided on its two faces,
a number of collector elements equal to the number of distributor elements, each collector element made of a conductive material and each including an upper portion and a lower portion having the same dimensions, said upper and lower portions being spaced apart from each other, completely overlapping each other in parallel alignment, and being electrically connected together and presenting perforations;

wherein said distribution channels are configured to supply a same reagent to both faces of each distributor element simultaneously;

the collector elements are grouped in pairs, each pair comprising an upper element and a lower element, and each pair configured such that the upper element engages the lower element, one in another, such that three gaps are formed between upper and lower portions within each element pair, a cell is positioned in the middle gap of each pair of elements, located between the upper portion of the lower element and the lower portion of the upper element a distributor element is positioned between each of the remaining two gaps of each pair of elements, and a cell is positioned between any adjoining pairs of elements.

* * * * *